Oct. 28, 1952    S. PRZYBOROWSKI    2,615,237
APPARATUS FOR MAKING CROSS FIN COILS
Filed April 23, 1947    8 Sheets-Sheet 2

INVENTOR.
Stanislaus Przyborowski.
BY
Albert R. Henry
ATTORNEY

Oct. 28, 1952     S. PRZYBOROWSKI     2,615,237
APPARATUS FOR MAKING CROSS FIN COILS
Filed April 23, 1947     8 Sheets-Sheet 4

INVENTOR.
Stanislaus Przyborowski,
BY
Albert R. Henry
ATTORNEY

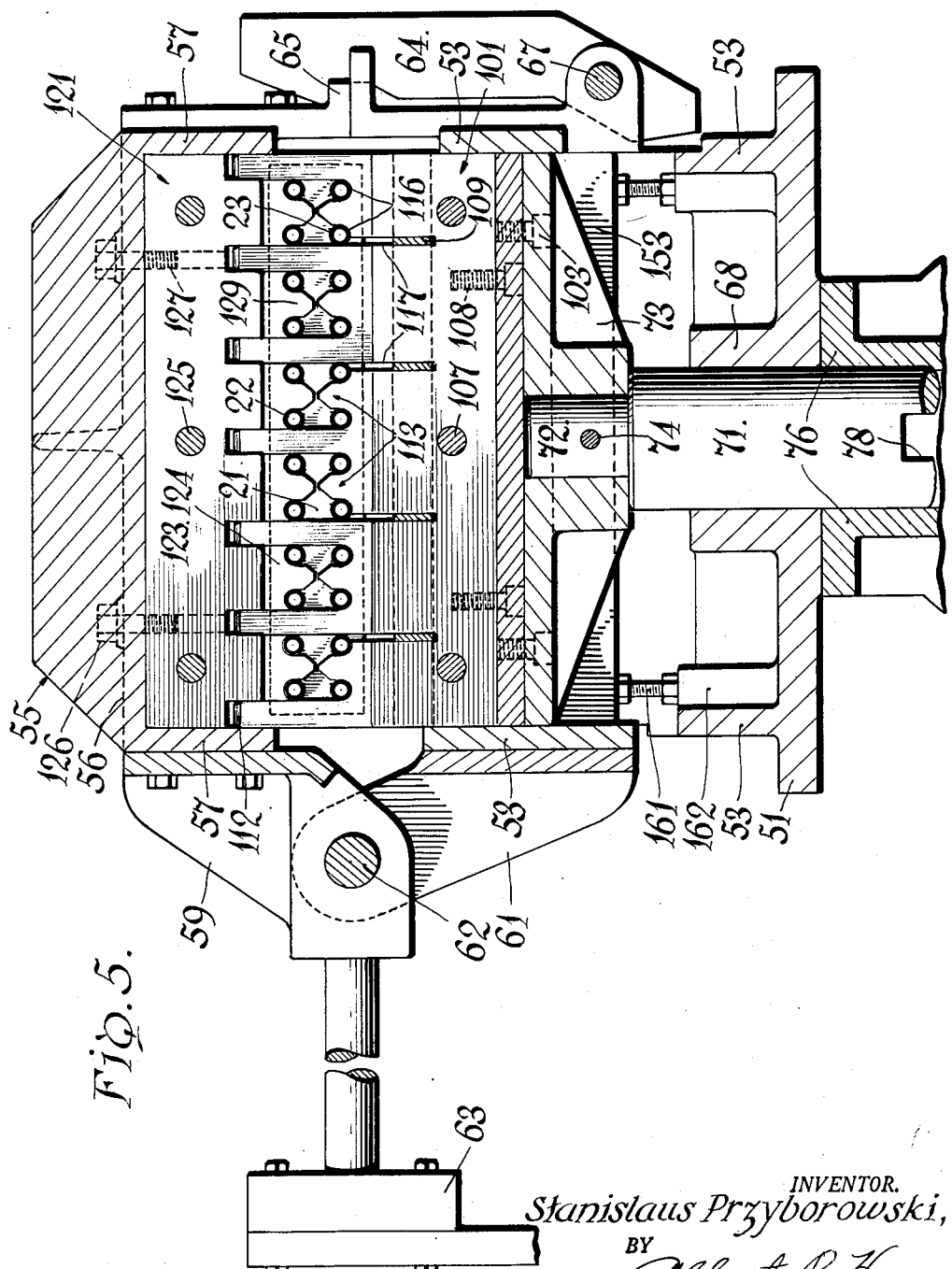

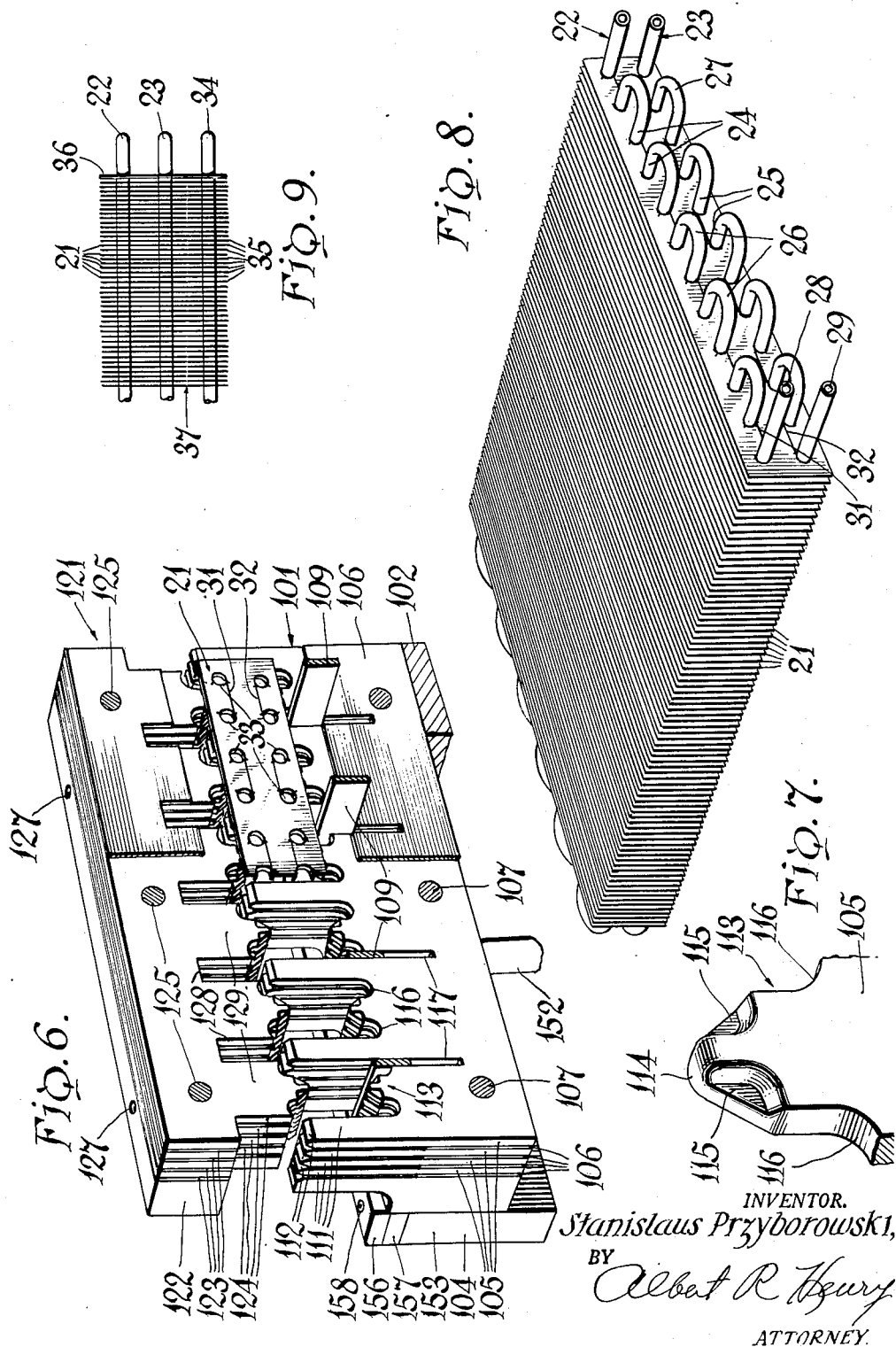

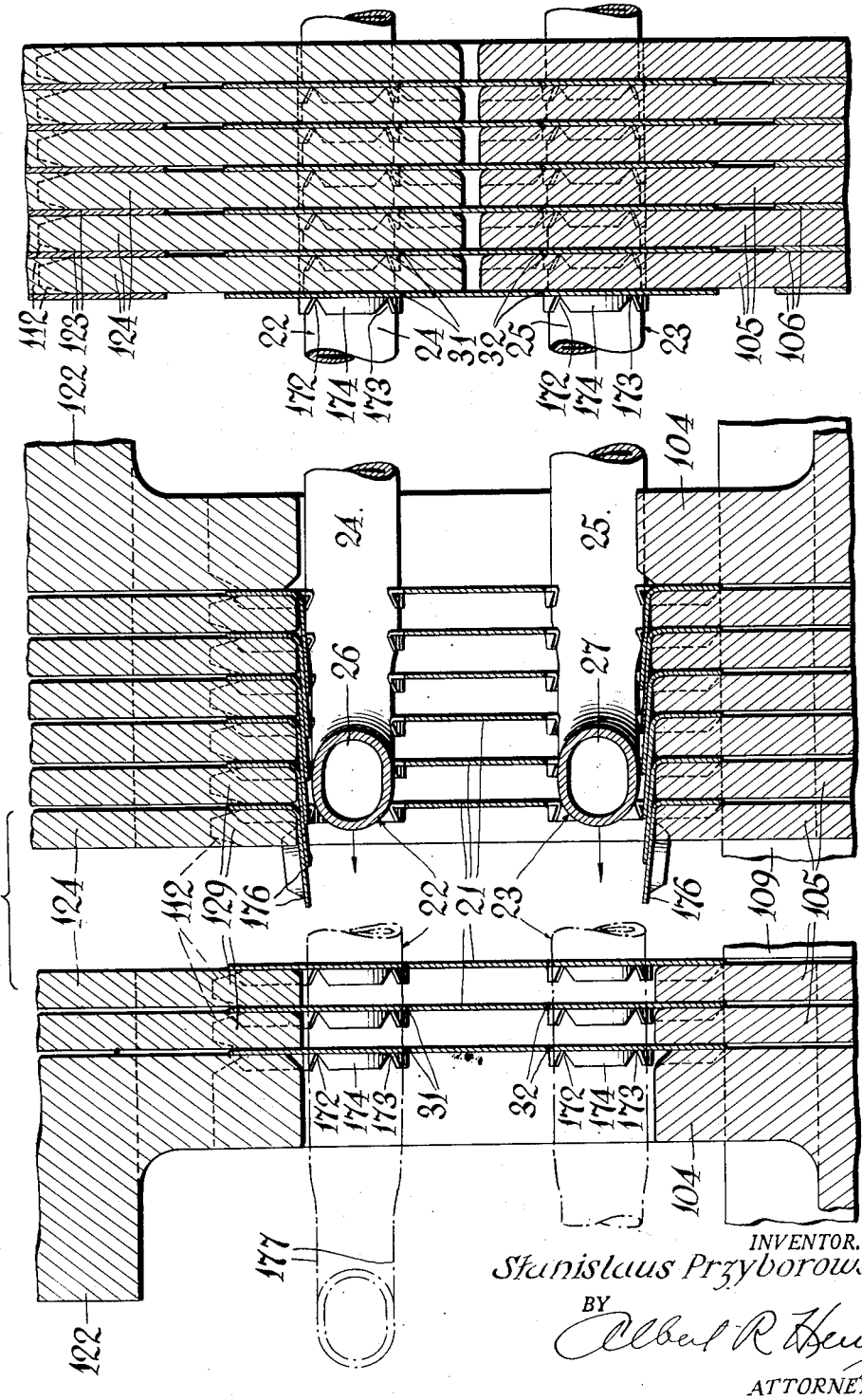

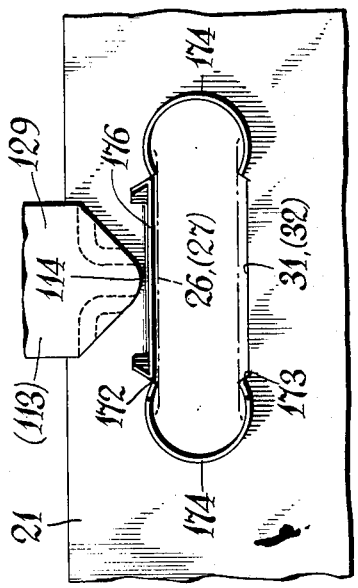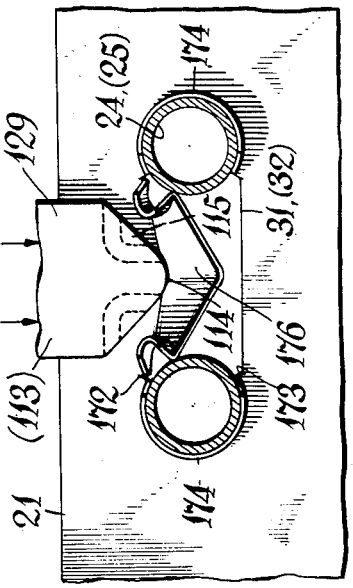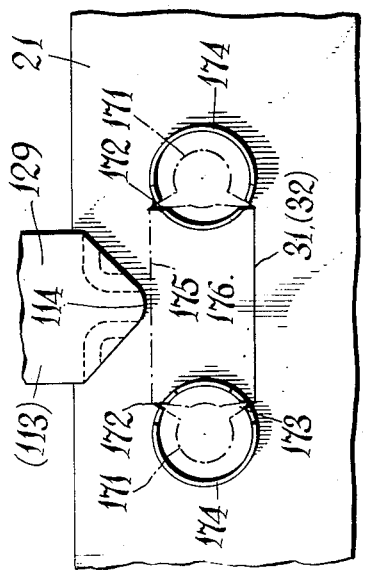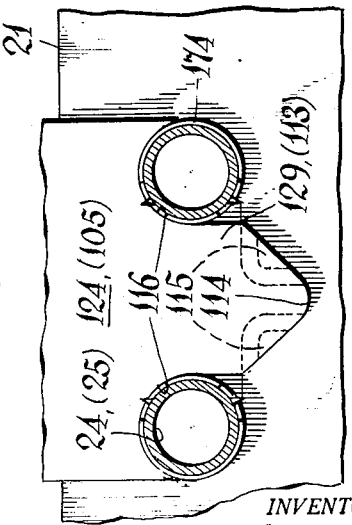

Patented Oct. 28, 1952

2,615,237

UNITED STATES PATENT OFFICE 2,615,237

APPARATUS FOR MAKING CROSS FIN COILS

Stanislaus Przyborowski, Kenmore, N. Y., assignor to Fedders-Quigan Corporation, Buffalo, N. Y., a corporation of New York Application April 23, 1947, Serial No. 743,385

3 Claims. (Cl. 29—202)

This invention relates to apparatus for making cross fin coils, or coils useful for heat exchange purposes wherein a plurality of parallel tubes are traversed by a plurality of metallic fins. The invention has especial utility in the fabrication of such structures wherein the stretches of tubing are provided with integral return bends connecting adjacent lengths, and the fins themselves are substantially continuous transversely of the tubes.

In my prior Patents Nos. 2,181,107 and 2,181,108 of November 21, 1939, I have disclosed a method and apparatus for fabricating coils in which the tube is continuous by bending a straight length in serpentine fashion, so that separately formed return bends are eliminated, and wherein the fins, extending transversely of all of the tube stretches, are also substantially continuous. This result, which provides a heat exchange coil free from potential leaks and of high thermal efficiency, is obtained by nesting the fins in properly spaced relation, and weakening portions of them, as by punching and slitting, so that the preformed tube can be moved through the fin assembly, the return bends displacing the metal of the fins between the adjacent straight lengths. Thereafter, by means of dies contained in the apparatus, the displaced portions of fin stock are pushed back to their original positions in the plane of each fin, and into tight engagement with the tubes.

For the specific embodiment of the apparatus shown in these patents, I proposed that the fins be slit along a line joining the centers of pairs of adjacent tube apertures, and that the restoration of the pairs of flaps—formed by the transfixing of the fins by the coil—should be effected by movement of pairs of die elements from each side of the assembly toward the line of centers. Such equipment has been employed successfully to manufacture substantial numbers of heat exchange coils, such as those suitable as condensers for air cooled refrigerating machines. Where a multiple pass coil has been desired, two or more single pass coils, as made according to my prior inventions, have been assembled on a common frame, and the necessary connections made in the usual manner.

According to the present invention, improved apparatus is provided, by means of which a double pass coil, or one having two rows of straight tubing lengths which may be connected by integral return bends, may be formed with continuous cross fins in one operation. This new result is obtained by slitting or otherwise weakening the fin stock along lines of tangency to the tube apertures, rather than along a line of centers. The single flaps for each row of tubing, formed by the transfixing operation, are thereafter restored into the plane of the fin by die elements which operate from each side of the assembly. However, in lieu of employing cooperative pairs of closing dies, for each displaced flap, as in the specific embodiment of my prior patents, only one die element is employed. It is therefore now possible to close the flaps from each side without interference, and thus produce a coil having two tube passes, and continuous or integral fin stock interconnecting both of them.

The same apparatus is, of course, also applicable to the fabrication of single pass coils. Novel improvements over my original inventions include a new form of closing die element by means of which the displaced fin stock is "wrapped around" the adjacent tubes; mechanical means incorporated in the machine to eject or "strip" the coil from the die nest after its formation; and various improvements in the machine organization which will appear as this description proceeds. These facilitate the manufacture of heat exchange devices of this nature. They moreover enable the fabrication of coils having a closer fin spacing, and therefore greater heat transference per unit of area, than was considered originally attainable.

In the following description of a typical embodiment of the improved machine, reference will be made to the appended drawings, wherein:

Figs. 4 and 5 are sections taken substantially on the line 4—4 of Fig. 1, to the scale of Fig. 3, and respectively showing the relative positions of the parts before and after the operation of the fin stock restoring dies;

Fig. 6 is a perspective of a portion of the die nest assembly;

Fig. 7 is a perspective of the end of a die finger;

Fig. 8 is a perspective of a two-pass heat exchange coil made by the present apparatus;

Fig. 9 is a side view of a two-pass coil combined with a single pass coil to form a three-pass unit;

Fig. 10 is an enlarged fragmentary section through and lengthwise of the die block or nest, illustrating the action attending the movement of the tubes relative to the fins;

Fig. 11 is a view similar to Fig. 10, showing the effect of actuating the closing or fin restoring dies; and Figs. 12 to 15 inclusive are enlarged fragmentary views looking at the face of a fin, and showing the progressive actions of displacement and restoration of fin stock.

Figure 1:
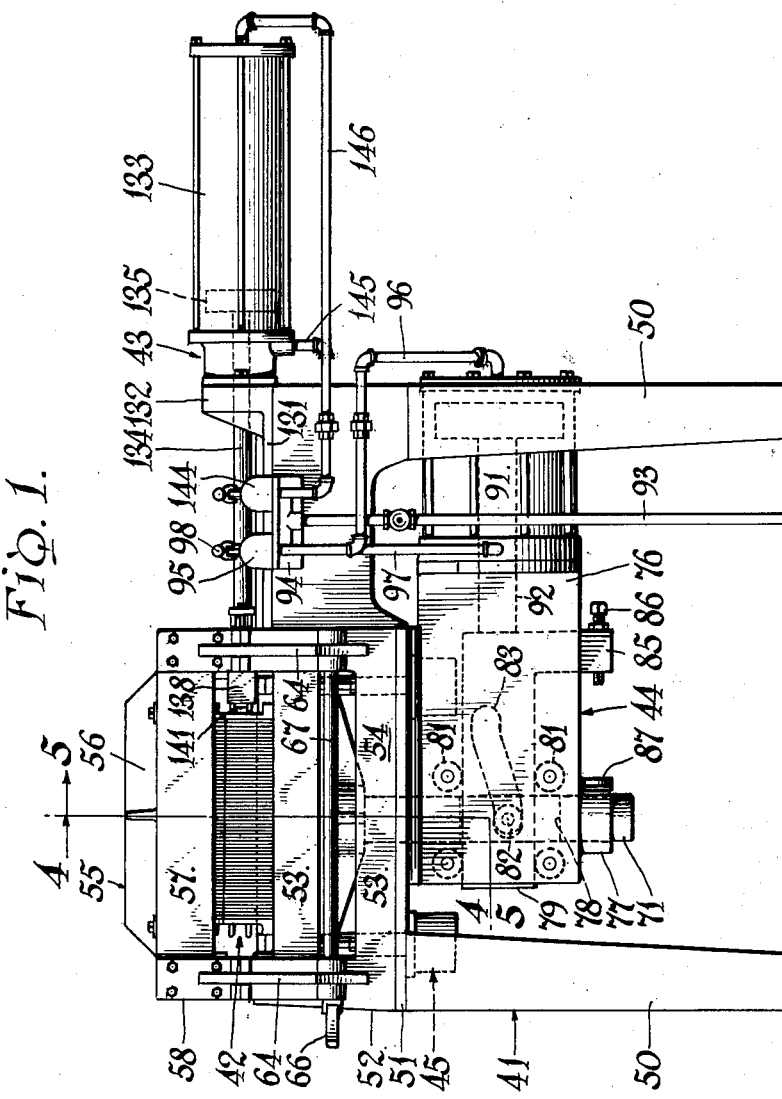
Fig. 1 is a front elevation of the machine as it appears at the completion of the fin and tube assembling operation.

Referring initially to Fig. 8, there is shown a cross fin and tube heat exchange coil having a plurality of closely spaced continuous metal fins 21 disposed transversely of an upper tube pass 22 and a lower tube pass 23—the terms "upper" and "lower" of course being used merely for purposes of differentiation. Each pass is formed of a number of parallel tube lengths or stretches 24 and 25 respectively, and these are alternately connected in series at their opposite ends by return bends 26 and 27, except for free terminal ends 28 and 29. Specifically, the return bends and stretches are integral with each other, and each pass is conveniently made by bending a continuous length of tubing into serpentine form. In order to position continuous fins on continuous tubes, it is necessary to cut away the fin stock so that the fin may pass over the return bends. If actually severed from the fin, the loss of stock would interrupt the continuity, lower the heat transfer capacity, and very frequently result in loose contact between fins and tubes.

It will be seen the the figure that continuity has been preserved, and this is effected by slitting the fin stock along lines which are approximately tangent to pairs of adjacent tube stretch apertures, as indicated by the numerals 31 and 32. This is also illustrated in Fig. 6, which fragmentarily shows a fin 21 in relation to the die and supporting elements. Such slits connect pairs of apertures 33, so that, when a tube pass is moved longitudinally of an assembly of fins, and toward the left as viewed in Fig. 8, the leading return bends displace the fin stock to a position away from the plane of the fin, and toward its upper and lower edges. Thereafter the voids between the connected tubes are filled by forcing the displaced stock back to substantially its initial position, thus providing a substantially continuous fin surface tightly engaging all of the tubes. As in the case of my earlier machine, the product so made may be used with or without subsequent soldering of the joints.

Referring to Fig. 9, there is shown a portion of a fin an tube assembly as just described, together with a single row or single pass unit having tubes 34 and fins 35, which is framed therewith by means of heavy end plates 36. The fins 21 and 35 are discontinuous, being spaced by a gap 37 which reduces heat transference. This figure therefore illustrates both the prior art practice of assembling a number of single row coils to make a multiple row unit, and also the present improvement whereby continuity is preserved for a multiple row unit.

In common with the machine of my prior invention, the improved machine operates by the method or procedure of supporting a plurality of fins in a nest or other suitable fixture, then moving the fin assembly relative to and lengthwise of the tube or tubes to transfix the fins, and thereafter inserting die members in the spaces between the fins and the connected tube lengths to restore the displaced metal to its initial position. To this end, the present machine, as shown in Figs. 1 to 5, comprises generally a supporting frame 41 on which is mounted a combined fin supporting and die structure 42, a tube supporting and impelling structure 43, and a die actuating structure 44. Additionally, the present machine includes a coil ejecting or stripping unit, generally indicated by the reference numeral 45.

The machine frame 41 comprises upright supporting legs 50 for a base plate 51 disposed at the left hand side, and from which extend upwardly spaced end walls 52 and front and back side walls 53, thereby to provide a generally rectangular receptacle or holder 54 for a portion of the die and nest member 42. An inverted upper similar receptacle or holder 55 is mounted above the holder 54, and it comprises a top 56, side walls 57, and end walls 58. The upper holder 55 is removably mounted with respect to the lower holder 54, by means of hinge lugs 59 and 61, secured to the respective holders, and which receive a hinge pin 62. The upper holder and its contents may therefore be moved away from the lower holder in order to insert fins in the machine. This pivotal action is facilitated by means of a counterweight 63 secured to the upper holder 55. The front sides of the holders are provided with complementary latches 64 and detents 65 to hold the receptacles together or in superimposed relation during the coil forming operations, and the latches 64 may be operated simultaneously through a handle 66 connected to a common latch pin rod 67, available from the front of the machine.

Figure 4:
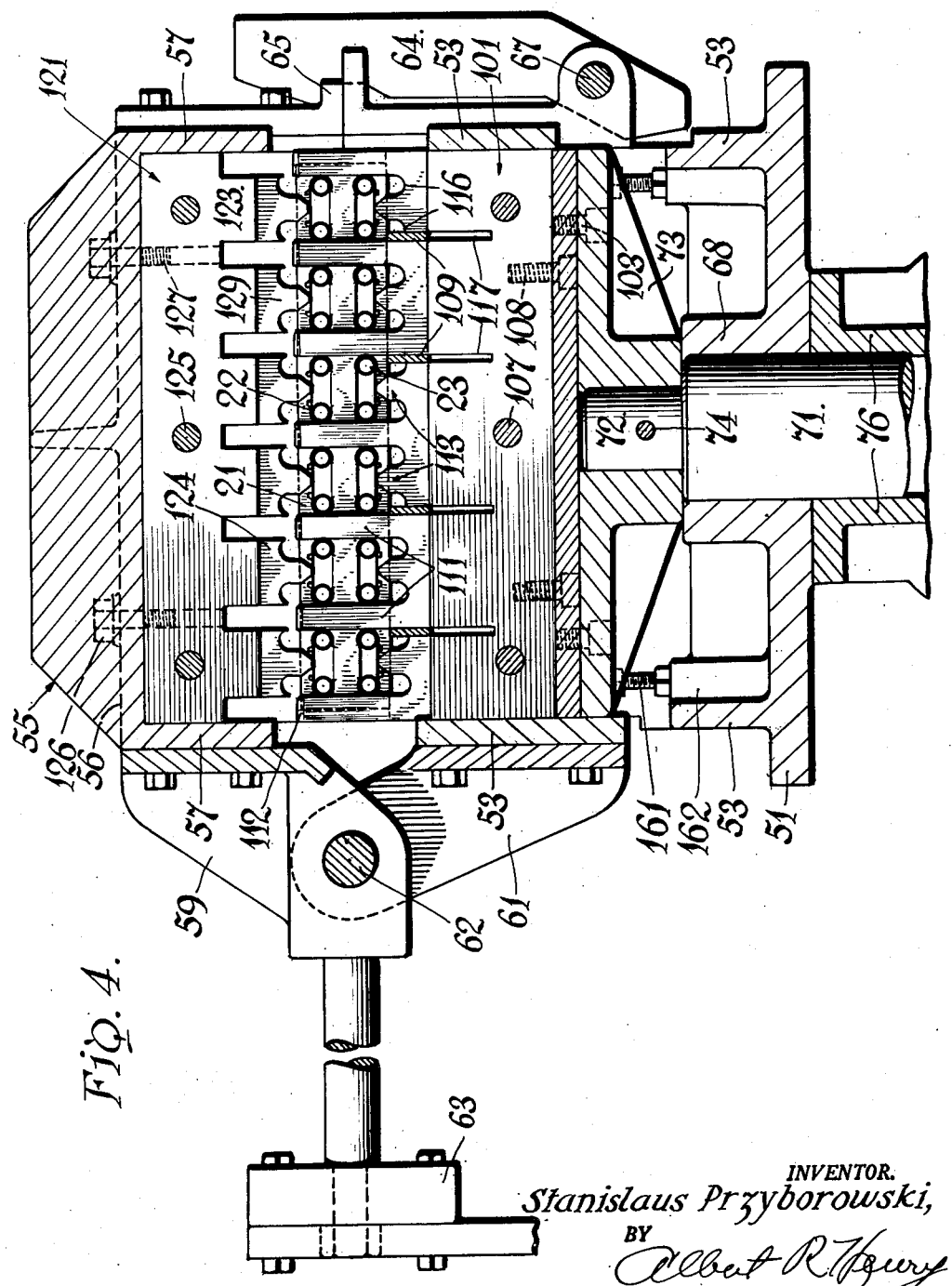

The base plate 51 is formed with a centrally disposed boss 68 provided with a bore to receive a vertically movable ram shaft 71. The upper end of the shaft 71 is formed with a reduced section 72, upon which is mounted a platen 73, secured to the shaft by a transverse pin 74. As best shown in Figs. 4 and 5, the edges of the platen 73 are adapted to slide freely over the adjacent surfaces of the side walls 53, so that the platen, and the members mounted thereon, are guided and maintained in correct alignment during their movement by the shaft 71. Up and down movement of the platen 73 is effected by the die actuating structure 44, which is conveniently mounted beneath the base plate 51.

The platen or die actuating structure includes a bifurcated bracket 76 bolted underneath the plate 51 of the main frame 41, to provide a support for a guide bearing 77 for the lower end of the ram shaft 71. The shaft 71 is longitudinally slotted intermediate its ends, as indicated by the reference numeral 78, to receive the forward end of a horizontally reciprocable cam plate 79, which is guided in its movement by pairs of rollers 81 rotatably mounted between the legs of the bracket 76. The shaft opening 78 is provided with a cam roller 82 mounted on an axle disposed transversely of the shaft 71 and cam plate 79, and this roller is positioned in a cam slot 83 formed in the plate 79. As shown in Fig. 1, this slot is so formed that as the plate 79 moves to the left, the shaft 71 is elevated, and as the plate moves to the right, the shaft and attached platen 73 are lowered.

A depending arm 85 formed on the cam plate 79 is provided with an adjustable set screw 86 adapted to abut a stop pad 87 on the bearing boss 77, so that the motion of the plate 79 to the left, and the upward displacement of the platen 73, may be accurately gauged and limited to the requirements of the particular coil assembly undergoing fabrication.

The operating motor for the cam plate 79 herein takes the form of a pneumatic cylinder 91 secured to the right hand side of the bracket 76, and whose piston rod 92 is directly connected to the cam plate. Operation of the motor is effected by a supply of compressed air flowing from a supply line 93 through a distributor 94 into a control valve 95, which may be set in a nuetral position, or to direct the air to either side of the motor piston through the lines 96 and 97. Upon movement of the valve operating handle 98 in one direction, as, for example, down, the pressure air flows from the line 93 through the line 96, thereby shifting the cam plate to the left. Movement of the handle 98 upwardly reverses the action, while shifting the handle to an intermediate position disconnects the air from the cylinder 91.

The combined fin supporting and tongue or flap restoring die structure 42 comprises sets of plates for the tube passes 23 and 22, respectively mounted in the holders 54 and 55. The lower set 101 (see Figs. 3, 4 and 6) includes a mounting plate 102 connected to the platen 73 by means of retaining screws 103. Relatively heavy end plates 104 at each end of the mounting plate 102 receive between them comparatively narrow die plates 105, which are spaced by means of rectangular spacer plates 106. The end plates, die plates, and spacers are secured to each other by longitudinally extending through bolts 107, and this assembly is mounted on the plate 102 by means of machine screws 108 entering taps formed in the end plates 104. The die plates 105 are slightly thinner than the intended spacing of the fins 21, and the spacer plates 106 are slightly thicker than the fin stock and are of less vertical height than the die plates, so that the assembly provides a plurality of narrow pockets in each of which a fin may be supported on edge. Fins of various widths may be supported in the pockets by means of beams 109, in a manner which will be described more fully hereinafter.

Each die plate 105 is formed with a plurality of upstanding fingers 111, so spaced as to receive between adjacent fingers the adjacent stretches of tubing 25, and to engage, along their edges, flanges formed around the apertures 33 of the fins 21. The fingers are provided with beveled top ends 112, to facilitate insertion of fins between adjacent die plates 105. Fins placed in the pockets between the die plates are therefore supported by the fingers against endwise movement, and significant displacement lengthwise of the die set.

The edges of the plates 105, between the fingers 111, are formed as die elements 113, the detailed formation of which is also shown in Fig. 7. Each such element, which is utilized to restore the fin stock displaced by a return bend 27, includes a ganerally V-shaped tip 114 provided with laterally disposed recessed portions 115 on one face which extend from the apex to the base of the tip. These surfaces are rounded or relieved of sharp corners, in order to avoid possible damage to the fin stock during the restoring operation. The tip portion 114 merges at its base on each side into arcuate grooves 116 which in turn blend into the fingers 111 at each side, to provide crimping die sections to press the fin stock firmly against the adjacent tube. In order to accommodate relative movement between the die set 101 and the supporting beams 109, the plates 104, 105, and 106 are formed with aligned slots 117 of sufficient width and depth to avoid any interference.

The upper die set 121 similarly is formed of relatively heavy end plates 122, spacer plates 123, and die plates 124, which are held together by means of through bolts 125. This assembly is retained in the upper holder 55 by screws 126, entering through the holder top 56 into taps 127 formed in the end plates 122. Obviously, the plates are of the same thickness as the corresponding lower plates, and they are vertically aligned in corresponding planes. They are also formed with slots 128, sufficiently deep and wide to receive the fingers 111 of the lower set 101, as the two assemblies are moved vertically toward each other.

The areas of the die plates 124, between the slots 128, constitute die fingers 129 of the same general character as the fingers 113, and which are intended to operate on the fin stock displaced by the upper tube pass 22. Inasmuch as the structure and formation of such fingers has already been described, repetition is believed to be unnecessary.

Figure 3:
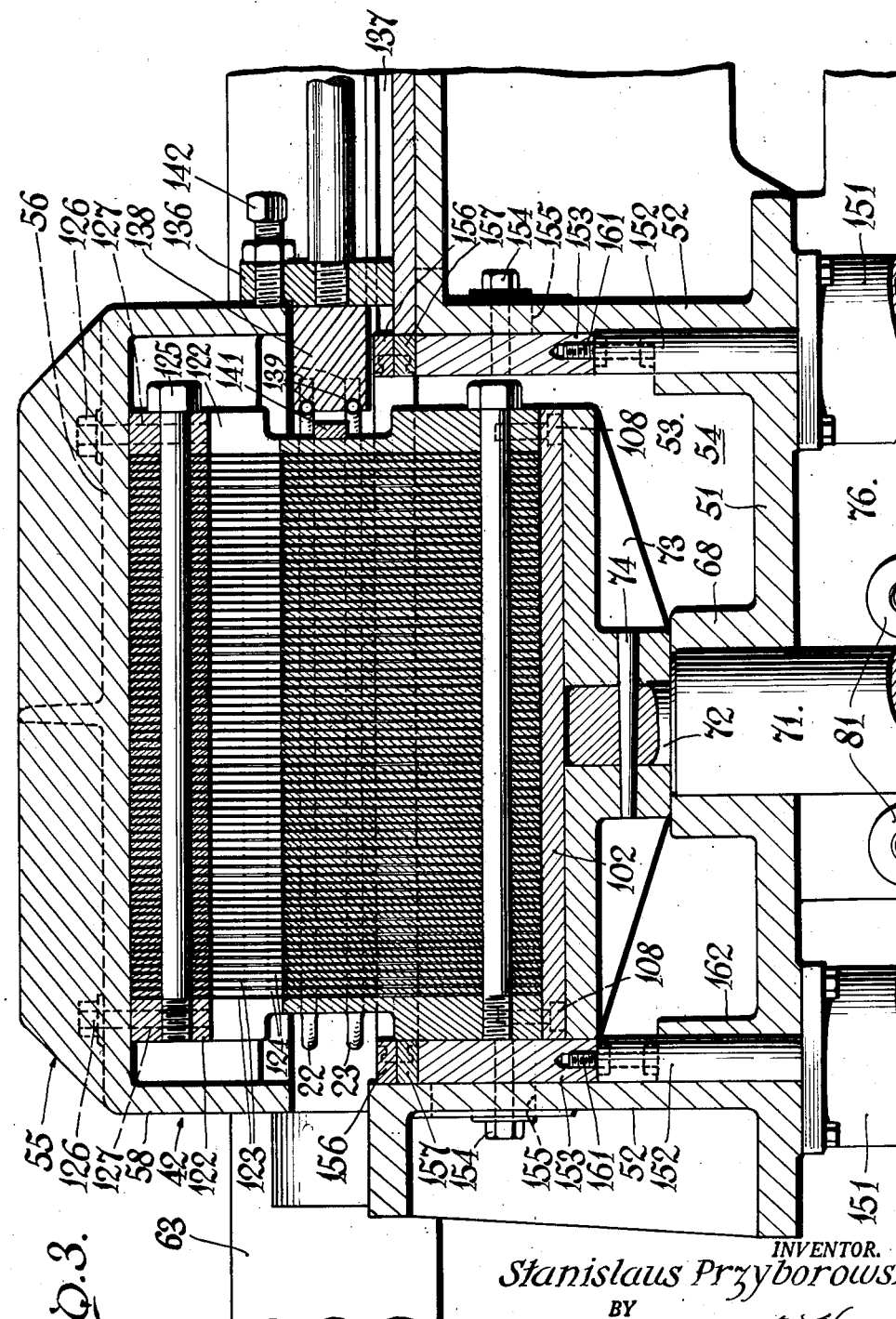
Fig. 3 is a section taken substantially along the line 3—3 of Fig. 2, on a further enlarged scale, with the upper die assembly in position.

By inspection of Figs. 3, 4, and 5, it will be seen that when the fins 21 are placed in the pockets between the lower supporting fingers 111, and the upper holder 55 is brought down over the lower holder 54, the die fingers 113 and 129 are positioned in slightly spaced relation to the pairs of tube apertures 33 and their connecting slits 32 and 31. When the platen 73 is elevated, the lower die set moves upwardly, to lift the fin assembly bodily, during which time the die fingers 113 and 129 also move over the fin surfaces toward each other, and into the spaces between the pairs of apertures. When the platen is lowered, as shown in Fig. 4, the open regions between holding fingers 111 and the superimposed die fingers provide passageways for the return bends of the tubes and their contiguous straight stretches. When the platen is raised (Fig. 5), the mutual approach of the die fingers between such straight stretches forces any displaced fin stock back to its initial position.

It will be noted that this basic action is the same as that in my earlier machine, but in partial contradistinction thereto, the upper die assembly is fixed with respect to the machine frame, and only one die finger is required to restore any given piece of displaced fin stock. When it is desired to use the machine to make a single pass coil, the upper die assembly 121 may be removed and replaced by a suitable stop piece, and the desired adjustment of the lower fingers 113 relative to the fin apertures effected by proper setting of the supporting beams 109.

Figure 2:
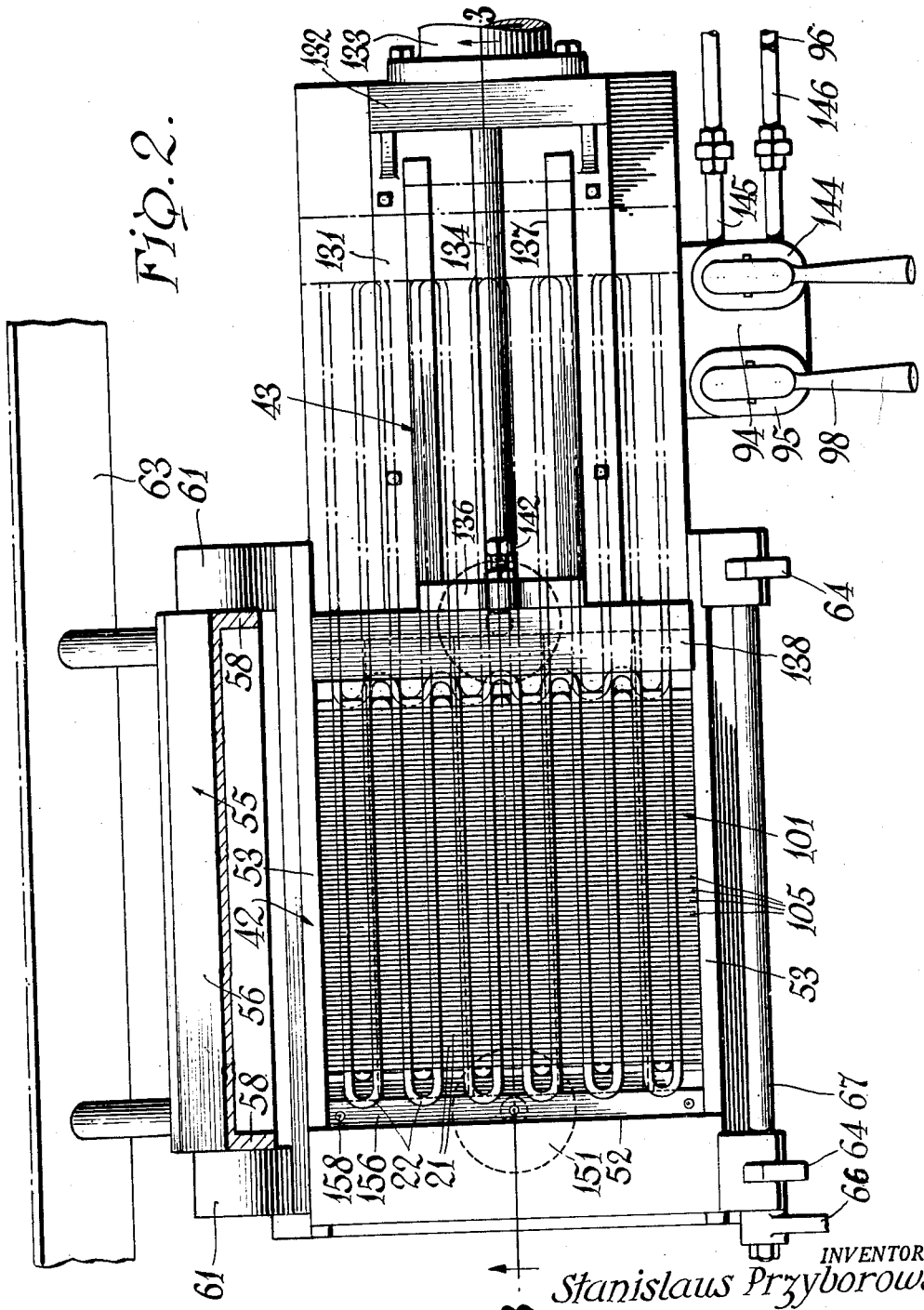
Fig. 2 is a top plan, on an enlarged scale, with the upper portion of the die and cover removed.

The tube impelling unit 43, as best shown in Figs. 1, 2, and 3, includes an angle plate 131 centrally located with respect to and secured to the right side of the machine frame 41. An air cylinder 133 is secured to a vertical leg 132 at the right hand extremity of the plate 131 with the axis of its piston rod 134 and piston 135 horizontally disposed and directed toward the holder and die assembly 42. The outer end of the piston rod 134 is connected to a crosshead 136, which is supported and guided for horizontal movement in a way 137 formed on the angle plate 131. The face of the crosshead 136 is provided with a tube pushing block 138, which is formed with two vertically spaced rows of sockets 139, adapted to receive and support the trailing return bends 26 and 27 and the terminal ends 28 and 29.

In order to support the tube passes 22 and 23 during the initial part of the transfixing operation, those portions of the right hand end plate 104 of the lower die assembly 101 corresponding to the die fingers 113 are formed with flat upper surfaces in lieu of full tips 114. The advancing or left hand return bends may therefore be laid on such flat surfaces, between the fingers 111, thereby to support the tube pass 23, through the return bends, at each end. The upper tube pass 22 is supported between the related sockets 139 in the pusher block 138, and a removable cross bar 141, which is temporarily positioned on the lower pass 23 to provide proper support and spacing. As shown in Fig. 3, this bar abuts the end pieces of the die assembly—the tubes simply sliding over it as they move to the left. The bar 141 may be removed after the tube impelling operation is completed. The advancing motion of the crosshead 137 and tubing may be determined and limited by an adjustable set screw 142 adapted to abut the upper holder wall 58.

Operation of the piston rod 134 is effected in a manner similar to that described for the motor for the platen 73. A control valve 144, similar to the valve 95, directs air from the line 93 to opposite sides of the piston 135, through the lines 145 and 146, or else shuts off the air supply so that the piston does not move. After the tubing is positioned, as shown in the dot and dash lines of Fig. 2, it is advanced through the fins 21 contained in the holder 42, until the stop screw 142 strikes its abutment to prevent further motion. The tubing is then in the full line position shown in Figs. 2 and 3, with the advancing return bends projecting beyond the left hand end plates 104 and 122, so as to clear the die fingers. The valve 144 is then reversed to withdraw the crosshead 136 and holder 139, and thereafter the valve 95 is manipulated to cause the die fingers to restore the flaps of fin stock which have been bent outwardly by the action of the impinging advancing return bends.

In order to facilitate the removal of the fin and tube assembly from the machine, there is provided the above referred to stripper mechanism 45. This mechanism comprises an elevator and supporting structure for the fin supporting beams 109, so that, upon upward movement of the beams with respect to the lower die set 101, the assembled coil is ejected from the dies where it may be be conveniently reached and removed.

A pair of pneumatic cylinders 151 are bolted to the under surface of the base plate 51, adjacent the end walls 52, and the base is drilled so that the cylinder piston rods 152 may move vertically with respect to the base. Each piston carries a transversely disposed bar 153 provided with a guide and retaining pin 154 vertically movable in a slot 155 formed in the end wall. The top surfaces of the bars 153 receive a pair of plates 156 and 157 formed with a dovetail-like notch (see Figs. 3 and 6) in which is locked the complementarily formed ends of the beams 109. Screws 158 retain the plates and beams in position. Adjustable stop screws 161, tapped into bosses 162 at the corners of the base plate 51, provide lower limit supports for the bars 153, so that the fin supporting beams 109 may be positioned in correct initial relationship with respect to the dies.

After the die mechanism 42 has been actuated to restore displaced fin metal, the platen 73 is retracted to withdraw the die fingers 113 and 129 from the fins, and to lower the coil assembly onto the beams 109 from which it was raised by the preceding motion. The upper holder 55 is then swung away from its operative superimposed position, by releasing the latches 64. If desired, the motion of the upper holder may be utilized to actuate a suitable valve (not shown) similar to the valves 95 and 144, to admit air to the lower portion of the cylinders 151, or such admission may be effected manually. In either event, the upward motion of the pistons 152 causes a like upward motion of the beams 109, and, as the lower die assembly 101 is now stationary, the beams lift the coil assembly so as to carry the fins and tubes up along the holding fingers 111, and place the coil in a position where the workman may easily grasp and remove it. The machine is then ready for another charge of fins and tubes to fabricate another coil.

The progressive action of forming, connecting, and restoring the fin stock is more fully illustrated in the enlarged views, Figs. 10 to 15 inclusive. Referring first to Fig. 12, the fin stock is fed to a suitable punch press or like tool, to provide pairs of openings 171, indicated by the dot and dash lines in the figure. Each such opening is formed with small notches 172 and 173, facing toward the adjacent opening, and located from each other circumferentially a distance less than 180°. The stock is then advanced to flanging dies, which strike out the metal around the openings 171 to form flanges 174 projecting at substantially right angles from the plane of the fin 21. These flanges are interrupted by the notches 172 and 173. The fin stock is also slit along a line parallel to the line of centers between the apertures 33, which are formed by flanging the openings 171, and the line of slitting joins the two inner notches 173. Inasmuch as these notches are only slightly displaced from the inner trace of the apertures, the slits 31 or 32 may, within the purview of this description, be called "tangential," as distinguished from "diametrical." They are very close to true tangential lines, and a few degrees displacement does not affect the results obtained. The inside diameter of the apertures 33 is, of course, substantially the same as the outside diameter of the tube which is to be placed through it.

It will be seen that if the weakened portion of the fin, defined by the area between the apertures 33 and the notches 172 and 173, is impacted, as from in back of the plane of the paper, such portion will be forced outwardly from the fin surface, and will tend to bend along the dotted line 175 in Fig. 12, which joins the outer notches 172. Such action, as shown in Fig. 13, may be obtained by using the return bend portion of the tubing as the impacting tool, to form an outstanding flap or tongue 176.

After the fins 21 have been formed and cut to size, they are positioned, as previously explained, in the pockets between the lower die plates 105, being retained in position by the holding fingers 111. As shown in Fig. 10, the flanges 174 are then disposed under the relatively movable die elements 113 and 129 on the lower and upper plates 105 and 124. In this figure, the flanges 174 are shown as being of less length than the actual spacing between the fins, but it should be understood that a closer spacing may be employed if desired.

As the tubes 22 and 23 are now moved from the right to the left, as viewed in Fig. 10, the return bends 26 and 27 progressively strike the weakened portions of the fins, forcing out the flaps 176, which may successively underlap each other, depending on the tube diameter and fin spacing. Inasmuch as it has been proposed to notch the flanges 174 at circular spacings of less than 180°, it is also advantageous to flatten the advancing return bends slightly, as indicated by the numeral 177 in Fig. 10. The tubes may then advance through the fins with tight engagement on the undisplaced flange portion of the apertures 33, and which constitutes an arc somewhat greater than 180°. The advancing tube bends finally take the position shown by the dot and dash lines of Fig. 10, at which time the transfixing operation is completed.

The tongues or flaps 176 now overlap the tips of the die elements 113 and 129, and are in a position to be restored to their initial positions by relative vertical movement. Referring again to Fig. 13, it will be seen that the flap 176 is slightly wider than the minimum space between the tubes, although the flap must pass through this restricted gap in order to be fully restored. To effect the action, the die tips 114 are therefore formed as V-shaped members, so that they engage the flaps at the central point between the outer notches 172, and also at some slight distance from the surface of the fin.

The resulting action is illustrated in Fig. 14. Upon initial impact, caused by the movement of the die tips towards each other, as previously explained, the central portion of the flap is bowed downwardly, thereby decreasing the transverse overall width so that the outer flanged edges may pass around the adjacent portions of the tube stretches. Once the corners of the flaps have passed around the tube surfaces, the edges of the flaps tend to follow the now-diverging tube surfaces, and due to the continued application of pressure and the resilience of the metal, the flaps are replaced in the plane of the fin.

As the dies continue to move over the fin surfaces, as shown in Fig. 15, and also in Fig. 11, the plane continuous surfaces of the die tips, below the recesses 115, act to force the flap metal substantially into the plane of the fin, as though one were ironing out a ruffled surface. At this time, the arcuate die portions 116 engage the outer portions of the flanges 174, forcing and crimping them tightly against the contacting surface of the tubes. Upon withdrawal of the restoring dies, there is no further displacement of the metal, thereby resulting in a substantially continuous cross fin engaging a series of continuous tubes.

While the invention has been primarily described with respect to its application in forming a multiple pass cross fin coil having continuous tubes and integral return bends intersected by continuous fins, it will be understood that it is not limited to fabricating such coils, but that it may be employed for making other fin and tube assemblies. It will also be appreciated that the numerous improvements herein described are subject to modifications and variations without departure from the principles of the invention. Accordingly, it is not intended that the invention be restricted to the specific embodiment described, but that it should be deemed to encompass all such equivalents, substitutions, and alterations as are within the scope of the following claims.

I claim:

1. A combined fin supporting and displaced fin restoring apparatus comprising a first set of a plurality of spaced plates between which fins are adapted to be supported on edge, spaced upstanding holding fingers formed on said plates, the edges of the plates between the fingers being formed adjacent said fingers with substantially semicircular die portions merging into tip die portions projecting beyond said semicircular portions, the height of said tip die portions as measured from the base of the semicircular portions being greater than twice the radius of said semicircular portions, a second set of spaced plates formed with die fingers, means to hold said second set aligned with the first named set of plates with the plates lying in a series of common parallel planes, means to hold the sets of plates in spaced relation and to move them into closer proximity while in said planes, said second set of plates being formed with alternate die fingers and slots, said slots having a width and depth to receive the holding fingers of the first set of plates when said sets are moved into close proximity, the die fingers of the second set having a width slightly less than the spacing of the holding fingers of the first set, the edges of said last named fingers being formed with arcuate die portions merging into projecting tip portions also having a height greater than twice the radius of said arcuate portions.

2. A fin retaining and flap closing die nest comprising a plurality of spaced parallel die plates forming a nest assembly having length, width, and height, spaced outstanding die fingers formed on the plates and disposed across the width of the nest, each of said die fingers having a base and a tip portion, said tip portion having sides tapering outwardly toward the base portion and towards adjacent die fingers, the edges of said die plates adjacent the base portions of the tips being formed as arcuate die portions, the height of the die fingers from base to tip extremity being greater than twice the radius of the arcuate die portions.

3. A fin retaining and flap closing die nest as set forth in claim 2, wherein the die fingers are formed with recessed regions at each side of the tip portion and a substantially plane area on the face of the finger at the base of the tip and its recessed portions.

STANISLAUS PRZYBOROWSKI.

REFERENCES CITED

The following references are of record in the file of this patent:

UNITED STATES PATENTS

| Number | Name | Date |
|---|---|---|
| 2,057,244 | Maynes | Oct. 13, 1936 |
| 2,156,538 | Maynes | May 2, 1939 |
| 2,181,108 | Przyborowski | Nov. 21, 1939 |
| 2,305,610 | Ernst | Dec. 22, 1942 |
| 2,339,032 | Schlenzig | Jan. 11, 1944 |
| 2,414,549 | Nowak | Jan. 21, 1947 |